US005343114A

United States Patent [19]

Beneking et al.

[11] Patent Number: 5,343,114

[45] Date of Patent: Aug. 30, 1994

[54] HIGH-PRESSURE GLOW DISCHARGE LAMP

[75] Inventors: Claus Beneking; Horst Dannert, both of Aachen; Manfred Neiger, Karlsruhe; Volker Schorpp, Bietigheim; Klaus Stockwald, Karlsruhe, all of Fed. Rep. of Germany

[73] Assignee: U.S. Philips Corporation, New York, N.Y.

[21] Appl. No.: 906,932

[22] Filed: Jun. 30, 1992

[30] Foreign Application Priority Data

Jul. 1, 1991 [EP] European Pat. Off. ........ 91201680.5

[51] Int. Cl.[5] ........................ H01J 65/04; H01J 61/16; H01S 3/00

[52] U.S. Cl. .................................... 313/485; 313/570; 313/607; 313/635; 313/643; 313/234; 313/568; 315/248; 315/344; 315/358; 372/82

[58] Field of Search ............... 313/485, 493, 494, 514, 313/563, 568, 570, 571, 607, 634, 643, 234, 635; 315/248, 344, 358; 372/82

[56] References Cited

U.S. PATENT DOCUMENTS

| | | | |
|---|---|---|---|
| 4,837,484 | 6/1989 | Eliasson et al. | 313/607 X |
| 4,945,290 | 7/1990 | Eliasson et al. | 313/607 X |
| 4,983,881 | 1/1991 | Eliasson et al. | 313/607 |
| 5,006,758 | 4/1991 | Gellert et al. | 313/607 X |
| 5,013,959 | 5/1991 | Kogelschatz | 313/607 X |
| 5,049,777 | 9/1991 | Mechterscheimer | 313/607 X |
| 5,072,157 | 12/1991 | Greb et al. | 313/607 X |
| 5,117,160 | 5/1992 | Kond et al. | 313/607 X |
| 5,173,638 | 12/1992 | Eliasson et al. | 313/607 X |

*Primary Examiner*—Donald J. Yusko

*Assistant Examiner*—Ashok Patel

*Attorney, Agent, or Firm*—Brian J. Wieghaus

[57] ABSTRACT

A high-pressure glow discharge lamp (1) having a planar discharge vessel (2) which is sealed in a vacuum-tight manner, which surrounds a discharge space (3) filled with a gas mixture which forms excimers, and whose parallel walls (4, 5) are formed from a dielectric material. The surfaces (6, 7) of the walls (4, 5) remote from the discharge space (3) are provided with planar electrodes (8, 9). At least one (5) of these walls with its associated electrode (8) is at least partly transparent to the generated radiation. The gas mixture includes at least one of the rare gases Xe, Kr and Ar for forming an excimer and at least one of the halogens $I_2$, $Br_2$, $Cl_2$ and $F_2$. The partial pressure of the substance forming the excimer is at least 10 and at most 600 mbar in the case of Xe and/or Kr and at least 10 and at most 1000 mbar in the case of Ar. The partial pressure of the halogen is between 0.05 and 5% of the partial pressure of the substance forming the excimer. The atomic mass of the substance forming the excimer is greater than the atomic mass of the halogen. The lamp has a high radiant efficacy and can be constructed as a large-area, homogeneously emitting radiant source.

22 Claims, 1 Drawing Sheet

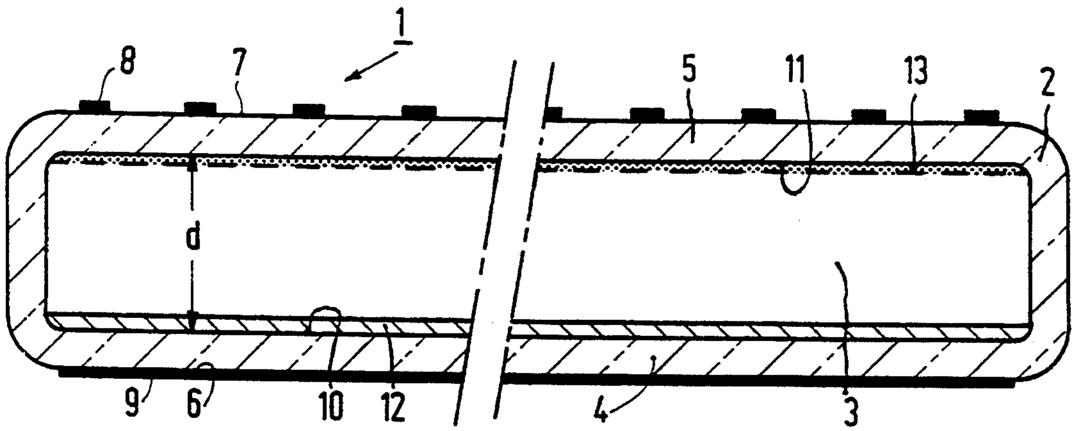
1
8
7
5
11
13
2
d
9
6
10
12
4
3

HIGH-PRESSURE GLOW DISCHARGE LAMP

BACKGROUND OF THE INVENTION

The invention relates to a high-pressure glow discharge lamp having a planar discharge vessel which is sealed in a vacuumtight manner and which encloses a discharge space filled with a gas mixture which forms excimers and whose parallel walls are formed from a dielectric material, the wall surfaces remote from the discharge space being provided with planar electrodes, at least one of said walls with its associated electrode being at least partly transparent to the generated radiation, and the gas mixture comprising at least one of the rare gases Xe, Kr and Ar to form the excimer and at least one of the halogens $I_2$, $Br_2$, $Cl_2$ and $F_2$.

A dielectrically impeded glow discharge (also called "silent discharge") is generated at a comparatively high gas pressure in a high-pressure glow discharge lamp. In these discharges, a gas filling which emits radiation upon electrical excitation as well as at least one dielectric are present between two planar electrodes which are completely or partly transparent. The electrical supply takes place with an AC voltage. The principle of the discharge is described, for example, in the article by B. Eliasson and U. Kogelschatz, Appl. Phys. B46 (1988) pp. 299–303.

A lamp of the kind described above is known, for example, from EP-A 0 324 953 (see also EP-A 0 254 111, 0 312 732, and 0 371 304). In the present description and claims, a planar discharge vessel which is sealed in a vacuumtight manner is understood to be a discharge vessel which comprises at least two substantially parallel walls, whose dimensions are large in comparison with the interspacing between these walls, and a side wall which seals off the assembly in a vacuumtight manner, while the walls may be plane-parallel or, alternatively, coaxial and a striking distance (d) is determined by the distance between the inner surfaces of the walls.

A dielectric, i.e. an electrically non-conductive material is used for the walls of the discharge vessel. At least one of the parallel walls is transparent to the generated suitable materials for the transparent wall include for example, glass, quartz, which is also transparent to UV, or the fluorides of magnesium or calcium which are transparent to very short-wave radiations. The dielectrics mentioned are in general resistant to breakdown and chemically resistant to the gas filling. The planar electrodes may be made of metal, for example, metal plating or metal layers. Transparent electrodes may be constructed as mesh or grid electrodes, for example, wire meshes or gold grids, or alternatively as transparent gold layers (5–10 nm), or electrically conducting layers such as indium oxide or tin oxide.

The invention has for its object to provide a high-pressure glow discharge lamp which has a high radiant efficacy, and, in addition, to render possible homogeneously emitting planar radiation sources having a large surface area and a high radiant efficacy.

SUMMARY OF THE INVENTION

This object is achieved with a high-pressure glow discharge lamp of the kind mentioned above in that the partial pressure of the substance forming the excimer is at least 10 and at most 600 mbar in the case of Xe and/or Kr and at least 10 and at most 1000 mbar in the case of Ar, in that the partial pressure of the halogen is between 0.05 and 5% of the partial pressure of the substance forming the excimer, and in that the atomic mass of the substance forming the excimer is greater than the atomic mass of the halogen.

The invention is based on the recognition that the greatest radiant efficacies are obtained in dielectrically impeded discharges comprising both rare gases forming excimers and halogens at partial pressures of the substance forming the excimer in the range from 10 to 600 mbar in the case of Xe and/or Kr and of 10 to 1000 mbar in the case of Ar, while the partial halogen pressure should be chosen in the range from 0.05 to 5% of the partial pressure of the substance forming the excimer. It was found that a further condition is that the atomic mass of the substance forming the excimer is greater than the atomic mass of the halogen. Finally, pure halogens $I_2$, $Br_2$, $Cl_2$ and/or $F_2$ are to be used. Radiant efficacies of far below 5%, which are too low for practical applications, are obtained outside the said ranges and with the use of halogen compounds, for example hydrogen halides, instead of pure halogens. When, according to the invention, the atomic mass of the substance forming the excimer is only slightly greater than that of the halogen, radiant efficacies of approximately 5% are obtained. This is the case with the combinations Ar—Cl (mainly 175 nm emission), Kr-Br (mainly 207 nm emission) and Xe—J (mainly 253 nm emission).

Preferably, the gas mixture in lamps according to the invention is so chosen that the atomic mass of the substance forming the excimer is more than twice the atomic mass of the halogen. Experiments have shown that radiant efficacies (measured at an operating frequency $f=5$ kHz and a striking distance $d=1$ cm) of more than 10% are possible with the following combinations: Ar—F (193 nm emission), Kr—F (248 nm emission) and Xe—F (351 nm emission). Radiant efficacies of 18, 13.5 and 14.5% were measured with the use of Kr—Cl (222 nm emission), Xe—Cl (308 nm emission) and Xe—Br (282 nm emission), respectively.

It has been found that the highest radiant efficacy values are obtained at partial pressures of the substance forming the excimer of at least 150 and at most 400 mbar and also at partial pressures of the halogen of between 0.07 and 0.2% of the partial pressure of the substance forming the excimer. These ranges are accordingly preferred in lamps according to the invention. The wall load [W/cm$^2$] can further be adjusted through the operating frequency, operating voltage, striking distance, thickness of dielectric, and dielectric constant of the dielectric. The operating frequency may be varied through several orders of magnitude (50 Hz–500 kHz), but as the operating frequency increases, especially above 50 kHz, cooling of the lamp may be necessary if high radiant efficacies are to be achieved.

A very advantageous embodiment of a lamp according to the invention solves the problem that the planar extension of the lamp is limited by the total pressure of the gas filling (basically, below 1000 mbar). Implosion may occur when a certain vessel size is exceeded, this size depending on the wall thickness and the maximum admissible mechanical strain occurring in the material. This limit typically lies at a linear dimension of the walls of 10 cm at a total pressure of approximately 100 mbar and wall thicknesses of 2–3 mm. High-pressure glow discharge lamps with large surfaces are realised according to the invention in that the gas mixture in addition contains at least one of the rare gases He, Ne, and Ar as a buffer gas, and in that the atomic mass of the buffer gas is smaller than the atomic mass of the substance forming the excimer.

A particularly advantageous modification of the above embodiment of the lamp according to the invention is characterize in that the partial pressure of the substance forming the excimer is smaller than A/d and the partial pressure of the buffer gas is smaller than B/d, in which d is the striking distance in cm, and A=120 mbar.cm for Xe
A=180 mbar.cm for Kr
A=1000 mbar.cm for Ar
B=2200 mbar.cm for Ne
B=1800 mbar.cm for He
B=200 mbar.cm for Ar, and in that the total pressure has a value of between 500 and 1500 mbar.

It has been found that a stable discharge characteristic which is homogeneous over the entire surface and has a high radiant efficacy is obtained when the individual partial pressures are chosen within the given ranges in accordance with the vessel geometry. Outside these ranges, in fact, no diffuse discharge which is homogeneous over the surface is formed in general at higher pressures, the discharge contracting instead into a plurality of narrowly defined filaments which are distributed over the surface. A filamented discharge characteristic has a lower radiant efficacy, and is in addition undesirable for applications in optical technology because of the inhomogeneity which arises. When the above conditions for the partial pressures are fulfilled, large-area high-pressure glow discharge lamps can be realised, for example, on the order of 20 cm ×30 cm or even larger, which yield a high radiant efficacy in combination with an operation which is homogeneously distributed over the surface.

A further preferred embodiment of a lamp according to the invention is characterized in that the discharge vessel has an internal layer of a fluorescent material. When fluorescent materials are used (for example, as described by Opstelten, Radielovic and Verstegen in Philips Tech. Rev. 35, 1975, 361-370), large-area, homogeneously radiating light sources can be manufactured which can find an application as a background illumination for large-area LCDs, luminous panels, display elements, etc.

Embodiments of lamps according to the invention are explained in more detail below with reference to the drawing.

BRIEF DESCRIPTION OF THE DRAWING

The sole FIGURE in the drawing diagrammatically and in cross-section shows a high-pressure glow discharge lamp 1 according to the invention.

DESCRIPTION OF THE PREFERRED EMBODIMENTS

The discharge vessel 2 which is sealed in a vacuum-tight manner is made of glass and comprises in the discharge space (3) a gas mixture which forms excimers and which is composed as follows:

900 mbar Ne as a buffer gas 100 mbar Xe to form an excimer.

$I_2$ in excess (partial $I_2$ pressure approximately 0.5 mbar at 30° C.). The parallel walls (4, 5) of the glass vessel 2 have a wall thickness of 2 mm and are provided with planar electrodes (8, 9) at their surfaces (6, 7) remote from the discharge space (3). The electrode (8) consists of a metal grid which is transparent to the generated radiation (gold grid electrode; mesh 1.5 mm). The electrode (9) is a vapour-deposited mirroring aluminium electrode. The spacing between the inner surfaces (10, 11) of the walls (4, 5) is 0.5 cm (striking distance d walls (4, 5) are 21 ×29.7 $cm^2$ (DIN size A4) and are large in comparison with the striking distance d.

The excimer radiation generated by the glow discharge in the gas mixture comprises mainly the emission line at approximately 253 nm. The inner surfaces (10, 11) are provided with fluorescent layers (12, 13). The mixture of fluorescent materials emits white light upon excitation by the excimer radiation and comprises yttrium oxide. activated by trivalent curopium (red emission), cerium-magnesium aluminate activated by trivalent terbium (green emission), and barium-magnesium aluminate activated by bivalent curopium (blue emission). The thickness of the luminescent layer (13) at the exit side is smaller than the thickness of the luminescent layer (12) at the opposing side so as to hamper the emission of the generated light as little as possible. During operation (frequency 10 kHz, amplitude of operating voltage approximately 10 kV), a discharge characteristic which is homogeneous throughout the surface is stabilized, and a similarly homogeneous luminance of the lamp of approximately 3000 Cd/$m^2$ is. obtained.

A second embodiment is a flat UV radiator which emits homogeneously over its surface, for example, for UV contact lithography. The construction principle is essentially similar to that shown in the Figure. Instead of a rectangular glass vessel, however, a round discharge vessel made of quartz glass (diameter 4 cm) is used without a fluoresent layer. The radiator emits UV radiation (mainly 253 nm) homogeneously over its surface with a gas filling as indicated for the preceding embodiment. At frequencies of approximately 10 kHz and amplitudes of the operating voltage of between 4 and 20 kV, the efficiency of the UV band at 253 nm is 5% and the total efficiency in the 230-250 nm range is approximately 10%.

We claim:

1. A high-pressure glow discharge lamp having a planar discharge vessel sealed in a vacuumtight manner and enclosing a discharge space, said discharge vessel including parallel walls of a dielectric material, the parallel walls having exterior wall surfaces remote from the discharge space, parallel electrodes on each of the exterior surfaces of the planar walls, at least one of said walls with its associated electrode being at least translucent to radiation generated by the discharge vessel, and a gas mixture within the discharge space which forms excimers during lamp operation, the gas mixture comprising a rare gas selected from a first group consisting of Xe, Kr and Ar and a halogen selected from the group consisting of $I_2$, $Br_2$, $Cl_2$ and $F_2$, characterized in that:

the partial pressure of the rare gas from the first group is at least 10 and at most 600 mbar for each of Xe and Kr and at least 10 and at most 1000 mbar for Ar, in that the partial pressure of the halogen is between 0.05 and 5% of the partial pressure of the rare gas from the first group, and in that the atomic mass of the rare gas from the first group is greater than the atomic mass of the halogen.

2. A high-pressure glow discharge lamp as claimed in claim 1, characterized in that the atomic mass of the rare gas from the first group is more than twice the atomic mass of the halogen.

3. A high-pressure glow discharge lamp as claimed in claim 2, characterized in that the partial pressure of the rare gas from the first group is at least 150 and at most 400 mbar.

4. A high-pressure glow discharge lamp as claimed in claim 3, characterized in that the partial pressure of the halogen is between 0.07 and 0.2% of the partial pressure of the rare gas from the first group.

5. A high-pressure glow discharge lamp as claimed in claim 4, characterized in that the gas mixture further comprises a buffer gas comprising a rare gas selected from a second group consisting of He, Ne and Ar, and in that the atomic mass of the buffer gas is smaller than the atomic mass of the rare gas from the first group.

6. A high-pressure glow discharge lamp as claimed in claim 5, characterized in that the partial pressure of the rare gas from the first group is smaller than A/d and the partial pressure of the buffer gas from the second group is smaller than B/d, in which d is the striking distance in cm between said parallel walls, and A=120 mbar.cm for Xe
A=180 mbar.cm for Kr
A=1000 mbar.cm for Ar
B=2200 mbar.cm for Ne
B=1800 mbar.cm for He
B=200 mbar.cm for Ar, and in that the total pressure has a value of between 500 and 1500 mbar.

7. A high-pressure glow discharge lamp as claimed in claim 6, characterized in that the discharge vessel comprises an internal layer of a fluorescent material.

8. A high-pressure glow discharge lamp as claimed in claim 5, characterized in that the discharge vessel comprises an internal layer of a fluorescent material.

9. A high-pressure glow discharge lamp as claimed in claim 4, characterized in that the discharge vessel comprises an internal layer of a fluorescent material.

10. A high-pressure glow discharge lamp as claimed in claim 3, characterized in that the discharge vessel comprises an internal layer of a fluorescent material.

11. A high-pressure glow discharge lamp as claimed in claim 2, characterized in that the discharge vessel comprises an internal layer of a fluorescent material.

12. A high-pressure glow discharge lamp as claimed in claim 1, characterized in that the discharge vessel comprises an internal layer of a fluorescent material.

13. A high-pressure glow discharge lamp as claimed in claim 2, characterized in that the gas mixture further comprises a buffer gas comprising a rare gas selected from a second group consisting of He, Ne and Ar and in that the atomic mass of the buffer gas is smaller than the atomic mass of the rare gas from the first group.

14. A high-pressure glow discharge lamp as claimed in claim 13, characterized in that the partial pressure of the rare gas from the first group is smaller than A/d and the partial pressure of the buffer gas from the second group is smaller than B/d, in which d is the striking distance in cm between said parallel walls, and A=120 mbar.cm for Xe
A=180 mbar.cm for Kr
A=1000 mbar.cm for Ar
B=2200 mbar.cm for Ne
B=1800 mbar.cm for He
B=200 mbar.cm for Ar, and in that the total pressure has a value of between 500 and 1500 mbar.

15. A high-pressure glow discharge lamp as claimed in claim 1, characterized in that the gas mixture further comprises a buffer gas comprising a rare gas selected from a second group consisting of He, Ne and Ar, and in that the atomic mass of the buffer gas is smaller than the atomic mass of the rare gas from the first group.

16. A high-pressure glow discharge lamp as claimed in claim 15, characterized in that the partial pressure of the rare gas from the first group is smaller than A/d and the partial pressure of the buffer gas from the second group is smaller than B/d, in which d is the striking distance in cm between said parallel walls, and A=120 mbar.cm for Xe
A=180 mbar.cm for Kr
A=1000 mbar.cm for Ar
B=2200 mbar.cm for Ne
B=1800 mbar.cm for He
B=200 mbar.cm for Ar, and in that the total pressure has a value of between 500 and 1500 mbar.

17. A high-pressure glow discharge lamp as claimed in claim 2, characterized in that the partial pressure of the halogen is between 0.07 and 0.2% of the partial pressure of the rare gas from the first group.

18. A high-pressure glow discharge lamp as claimed in claim 1, characterized in that the partial pressure of the halogen is between 0.07 and 0.2% of the partial pressure of the rare gas from the first group.

19. A high-pressure glow discharge lamp as claimed in claim 1, characterized in that the partial pressure of the rare gas from the first group is at least 150 and at most 400 mbar.

20. A high-pressure glow discharge lamp as claimed in claim 19, characterized in that the partial pressure of the halogen is between 0.07 and 0.2% of the partial pressure of the rare gas from the first group.

21. A glow discharge lamp, comprising:

a) a discharge vessel enclosing a discharge space and having a portion translucent to light;

b) a gas mixture within said discharge space which forms excimers during lamp operation, said gas mixture comprising a rare gas selected from the group consisting of Xe, Kr and Ar and a halogen selected from the group consisting of $I_2$, $Br_2$, $Cl_2$, and $F_2$, the partial pressure of the rare gas being at least 10 and at most 600 mbar for each of Xe and Kr and at least 10 and at most 1000 mbar for Ar, the partial pressure of the halogen being between 0.05 and 5% of the partial pressure of the rare gas, and the atomic mass of the rare gas being greater than the atomic mass of the halogen; and c) means for exciting said gas mixture within said discharge space to emit light.

22. A glow discharge lamp according to claim 21, wherein said discharge vessel includes spaced opposing walls with exterior surfaces, and said means for exciting said gas mixture includes electrodes on said exterior surfaces of said opposing walls.

* * * * *